(12) United States Patent  (10) Patent No.: US 8,438,080 B1
Xiao et al.  (45) Date of Patent: May 7, 2013

(54) LEARNING CHARACTERISTICS FOR EXTRACTION OF INFORMATION FROM WEB PAGES

(75) Inventors: Fei Xiao, Mountain View, CA (US); Cristos Goodrow, Mountain View, CA (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 12/790,551

(22) Filed: May 28, 2010

(51) Int. Cl.
*G06Q 30/00* (2012.01)
*G06F 17/30* (2006.01)

(52) U.S. Cl.
USPC .......................................... 705/27.1; 705/26.1

(58) Field of Classification Search ......... 705/26.1–27.2
See application file for complete search history.

(56) References Cited

U.S. PATENT DOCUMENTS

| | | | | |
|---|---|---|---|---|
| 7,421,306 | B2 * | 9/2008 | Adiseshan | 700/130 |
| 7,533,336 | B2 * | 5/2009 | Jaffe et al. | 715/243 |
| 2004/0143600 | A1 * | 7/2004 | Musgrove et al. | 707/104.1 |
| 2005/0114273 | A1 * | 5/2005 | Ettinger, Jr. | 705/80 |
| 2007/0078850 | A1 * | 4/2007 | Aziz et al. | 707/6 |
| 2008/0098300 | A1 * | 4/2008 | Corrales et al. | 715/243 |
| 2009/0210320 | A1 * | 8/2009 | Adelman et al. | 705/27 |
| 2009/0265251 | A1 * | 10/2009 | Dunlap et al. | 705/26 |
| 2009/0281890 | A1 * | 11/2009 | Aliabadi et al. | 705/14.34 |
| 2009/0281927 | A1 * | 11/2009 | Aliabadi et al. | 705/27 |
| 2010/0083095 | A1 * | 4/2010 | Nikovski et al. | 715/234 |

OTHER PUBLICATIONS

"PriceGrabber.com's Vice President of Technology to Speak at Microsoft FAST forward Summit." PR Newswire. Mar. 16, 2010. [recovered from Dialog on Apr. 13, 2012].*

* cited by examiner

*Primary Examiner* — Peter Choi
*Assistant Examiner* — Kathleen G Palavecino
(74) *Attorney, Agent, or Firm* — Fenwick & West LLP

(57) ABSTRACT

A learning module of an information retrieval system is configured to automatically learn distinctive characteristics used by different web sites when presenting data variables of interest. The learned information can then be used to identify data variables of interest on arbitrary web pages of the web sites. In one embodiment, the learning process is guided by feeds provided by the web sites that list values for data variables of interest, and by web pages also provided by the web sites. The values of the feeds enable the learning module to identify candidate portions of the web pages that may represent a data variable of interest. Weights are computed for different values of various properties of the candidate portions, aggregated over all the analyzed pages, and used to identify one of the candidate portions as being the best candidates.

22 Claims, 6 Drawing Sheets

LEARNING CHARACTERISTICS FOR EXTRACTION OF INFORMATION FROM WEB PAGES

BACKGROUND

1. Field of Art

The present invention generally relates to the field of digital information processing, and more specifically, to identifying and extracting information of interest from web pages.

2. Background of the Invention

Users rely on search engines and other information retrieval systems, such as that provided by GOOGLE, to provide comprehensive and accurate information that is of relevance to them. One important type of information relates to the availability of products and services (hereinafter collectively referred to simply as "products"). For example, users often explicitly submit queries for particular products of interest and wish to see information about the products, such as pictures, reviews, prices, availability, and the like. In other contexts, an information retrieval system may present the user with product information related to other information that the user is viewing. For example, if a user entered a query about digital photography via a search engine, the search engine might include advertisements for various digital cameras as part of the provided search results.

However, in order for an information retrieval system to provide comprehensive and accurate product information to users, the system must have up-to-date, accurate information on a wide range of products. Since key product information, such as price and availability, is known only to the merchant selling the product or service, the information retrieval system must thus have a way of obtaining the product information from the various merchants.

Some merchants provide certain information retrieval systems with updates (also known as "feeds") regarding their various products, including the products' titles, prices, and quantities in stock. Unfortunately, relying on merchants for such updates leaves a number of problems unsolved. For example, the updates are often too infrequent to quickly account for changes in product information. Thus, after a change in product price (for example), the information retrieval system will continue to report the old, out-of-date price until the next update for the product is received from the product merchant. Similarly, out-of-stock items may incorrectly be reported as in-stock (or vice versa). This leads to user dissatisfaction after the users discover that, contrary to what the information retrieval system reported, they cannot (for example) purchase the product for the listed price. As an additional problem of relying on merchant updates, the information provided in the updates can also be inaccurate. For example, the updates may be generated manually by employees of the merchants, rather than automatically by a program, leading to inadvertent (or possibly intentional) inaccuracies. As a still further problem, merchants often provide updates on only a small subset of their products, and thus the information retrieval system gains no information at all about the remainder of the products.

Merchants typically store the up-to-date product information in their own product databases and use it to automatically generate product web pages as part of their own web sites. Users can use these product web pages to view detailed information about the products, read reviews, purchase the product, and the like. Among the detailed product information provided by the product web pages is the information of interest to the information retrieval system, such as product title, price, and availability. However, it is very difficult to automatically identify the information of interest from amongst all the other information presented by the product page. Even for a particular distinctive type of information, such as numerical price information, a given page typically presents a number of prices, such as prices for related products or non-discounted list prices, making it difficult to identify the actual price of the product of interest. To circumvent this difficulty, humans designing a search retrieval system may manually study the product web pages of a particular merchant to identify unique characteristics of information of interest. However, such manual analysis is expensive, time-consuming and has very limited utility. For example, manual analysis can at best address only a small number of merchants relative to the vast number of distinct merchants offering products, given the time required to analyze the product web pages of each merchant. Additionally, merchants may frequently alter the way that they present information on their product web pages, rendering the prior manual analysis obsolete and requiring completely new analysis.

SUMMARY

A learning module of an information retrieval system is configured to automatically learn distinctive characteristics used by different web sites when presenting data variables of interest. The learned information can then be used to identify data variables of interest on arbitrary web pages of the web sites.

In one embodiment, the learning process is guided by feeds provided by the web sites that list values for data variables of interest, and by web pages also provided by the web sites. The values of the feeds enable the learning module to identify candidate portions of the web pages that may represent a data variable of interest. Weights are computed for different values of various properties of the candidate portions, aggregated over all the analyzed pages, and used to identify one of the candidate portions as being the best candidate. In one embodiment, the candidate portions of web pages are nodes of the pages' document object models, and the properties for which weights are computed include text properties, tag type properties, and tag attribute properties.

In one embodiment, the learning process more specifically learns characteristics used to identify product data variables of interest on product web pages provided by merchants. The product data variables include product title, product price, and product availability.

In one embodiment, a computer-implemented method of learning characteristics of product variables within web pages of a merchant comprises receiving a product feed identifying a product offered by the merchant and having a value for a product variable associated with the product, obtaining, from the merchant, a web page associated with the product, and producing a model representing the web page, the model having a set of nodes representing portions of data of the web page. The method further comprises identifying candidate nodes of the model that match the product feed value for the product variable, determining, from the candidate nodes, product variable characteristics expected of a node representing the product variable, and storing the determined product variable characteristics.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
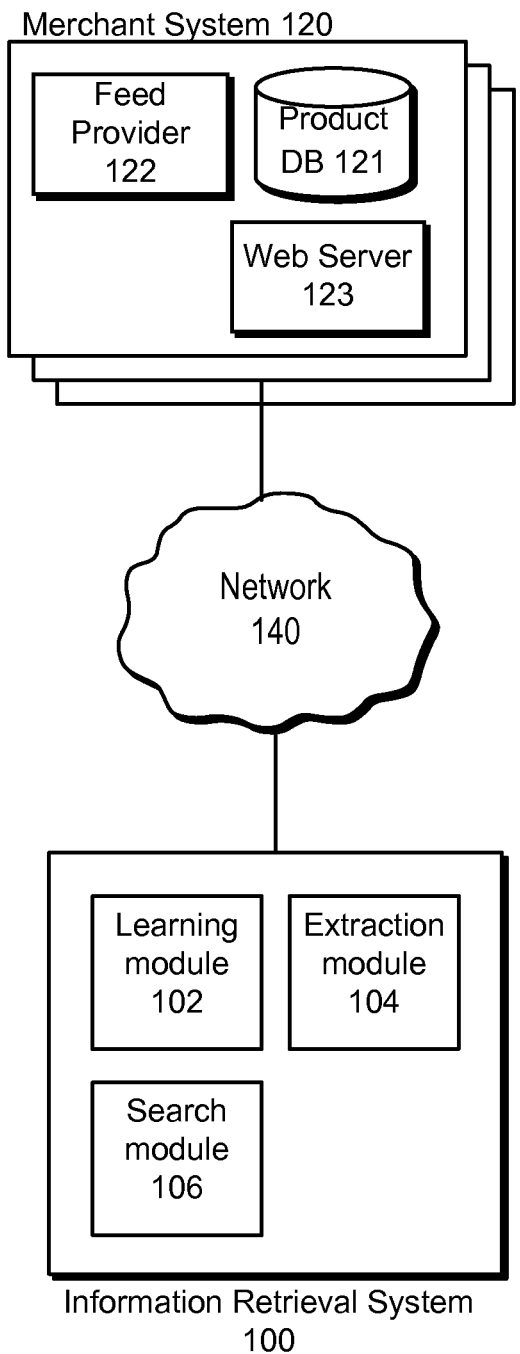
FIG. 1 is a block diagram of a computing environment, according to one embodiment of the present invention.

FIG. 1 is a block diagram of a computing environment, according to one embodiment. An information retrieval system 100 interacts with multiple merchant systems 120 over a network 140, learning distinctive characteristics of categories of information of interest as provided within product web pages of each of the merchant systems.

Each of the merchant systems 120 provides information about products sold by the merchant. Specifically, a merchant system 120 comprises a product database 121 storing information on the various products that it offers for sale. For example, the database might include, for each listed product, a primary key uniquely identifying the product, a title describing the product, a list price of the product, a promotional price of the product (if any), one or more images illustrating the product, a textual description of the product, and the like.

The merchant system further comprises a web server 123 that provides product web pages for the various products described in the product database 121. Potential customers can then view the product web pages to obtain more information about the products, such as prices, pictures, and reviews; to order the product; or to take other product-related actions. The product web pages could be generated in different ways. For example, the web server 123 might execute server-side code provided by the merchant that dynamically generates a product web page using a merchant-specific page template applicable to all of the merchant's products. Product-specific pages would then be generated by including product-specific information from the product database 121 at designated locations within the page template. Alternatively, the product web pages could be manually generated, rather than automatically generated.

The merchant system additionally comprises a feed provider module 122 that provides updates on the various products in the product database 121 in the form of feeds provided to subscribing systems. The feeds include, for each product, some predetermined set of categories of information directly from, or derived from, the information on the product within the database 121. For the sake of brevity, these categories of information about a product are hereinafter referred to simply as "product variables." For example, a feed for a product might include, as values of product variables, the uniform resource locator (URL) of the product web page provided by the web server 123, the title of the item, the current price of the item, and some indicator of the availability of the product, such as a quantity currently available.

In one embodiment, the information retrieval system 100 comprises a search module 106 for performing a search for designated information, a learning module 102 for learning characteristics identifying information of interest within the web pages provided by the merchant system 120, and an extraction module 104 for applying the learned characteristics to extract the information of interest. The search module 106 may comprise, for example, a search engine accepting a textual query and outputting information associated with it, including a set of links to related web pages or other documents, advertisements for products related to the query, and the like. In particular, the search module 106 may provide descriptions of, or advertisements for, products represented within the product database 121 of one or more of the merchant systems 120.

The learning module 102 learns characteristics used to identify product variables of interest via a combination of the product feeds and product web pages provided by the feed providers 122 and web servers 123 of the various merchant systems 120. The product variable values provided in the feeds act as a form of "ground truth" and serve to identify portions of the product web pages that contain the product variables of interest. The operations of this learning phase are further described with respect to FIGS. 3-6. Then, during an extraction phase, the extraction module 104 applies the learned characteristics to extract values of the data variables of interest from various product web pages of merchants. The extraction phase uses the learned characteristics rather than feed values to identify product variables of interest. Thus, by applying the learned characteristics the information retrieval system 100 is not limited to the product information from the feed providers 122 of the merchant systems 120. Rather, the information retrieval system 100 can at any time extract the accurate and up-do-date information from the product web pages themselves. The search module 106 can then present this information as part of the search results that it provides in response to a search query. For example, the search module 106 might determine that a given product is related to a user's query and present a textual advertisement in association with the search results, the advertisement including the extracted product information such as title, price, and availability.

Although the information retrieval system 100 is depicted in FIG. 1 as comprising the learning module 102, the extraction module 104, and the search module 106, it is appreciated that they need not all be present on the same physical system, or even within the distributed system of a single organization. For example, it is possible for a first organization to use the learning module 102 to learn the characteristics of interest, for a second, distinct organization to use the extraction module 104 to apply the characteristics learned by the first organization to extract the information of interest, and for a third, distinct organization to present portions of the extracted information in association with the results of a query.

It is further appreciated that although the learning module 102 of the information retrieval system 100 has been described as identifying product information of a merchant system 120, the identified information need not be limited to product information provided by merchants. Rather, the techniques employed by the learning module 102 can equally be applied to learn characteristics of a large number of different types of information from different information providers, provided that associated "ground truth" information—such as that of feeds—is available as an input for the learning.

The network 140 represents the communication pathways between the merchant systems 120 and the information retrieval system 100. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
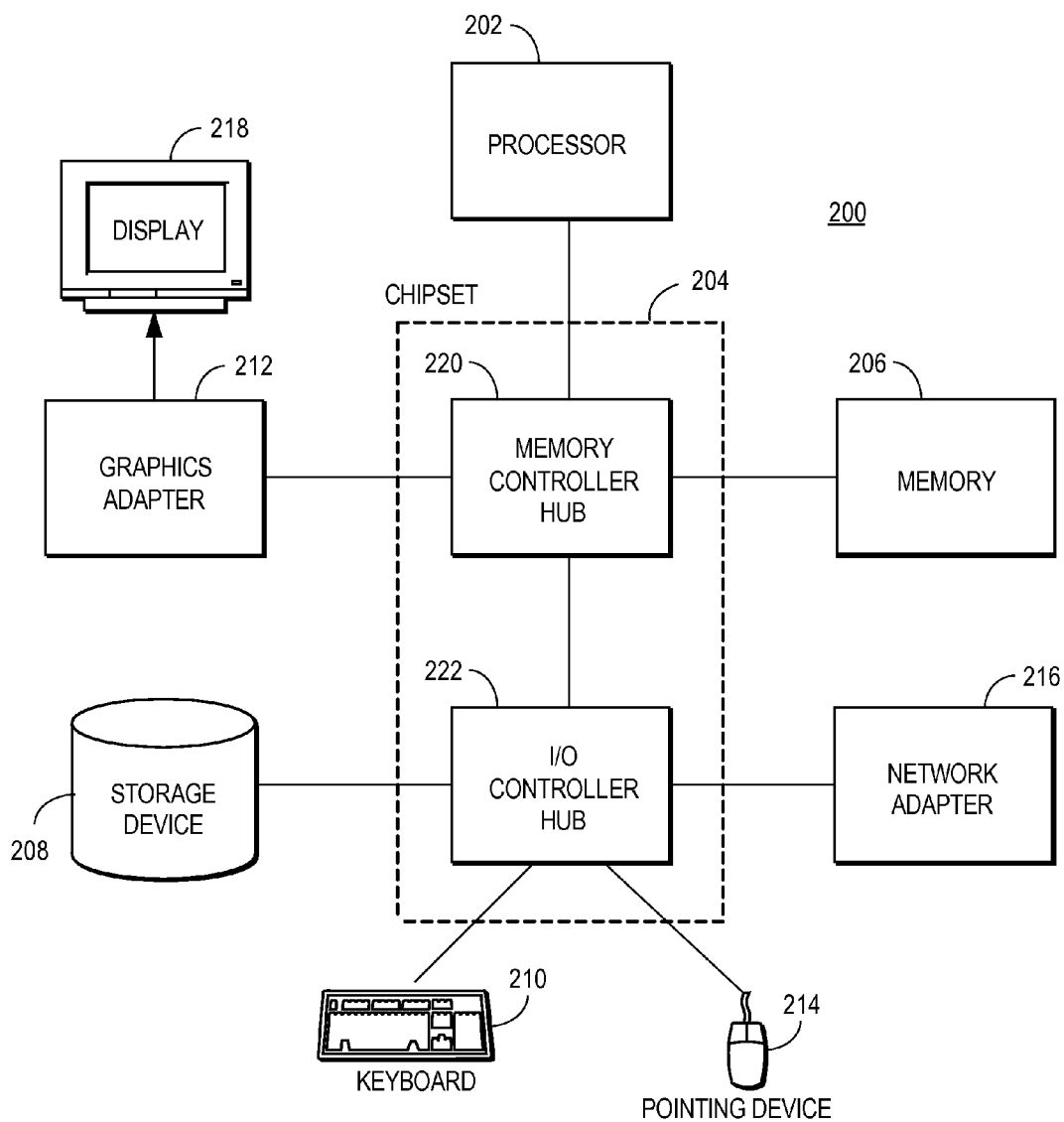
FIG. 2 is a high-level block diagram illustrating physical components of a computer, according to one embodiment.

FIG. 2 is a high-level block diagram illustrating physical components of a computer 200 used as part of the information retrieval system 100 and/or the merchant system 120 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
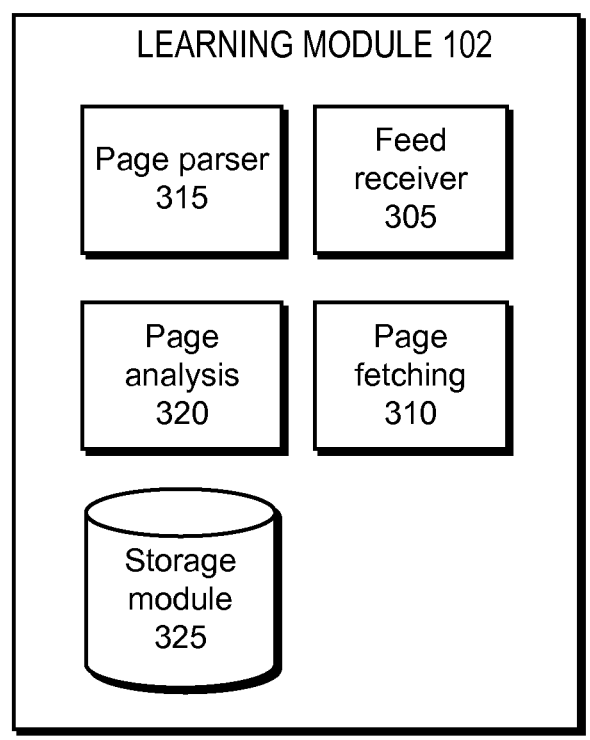
FIG. 3 is a block diagram illustrating a more detailed view of the learning module of FIG. 1 according to one embodiment.

FIG. 3 is a block diagram illustrating a more detailed view of the learning module 102 of FIG. 1 according to one embodiment. The learning module 102 comprises a storage module 325 that stores the input to, and output of, a learning process. The learning module 102 additionally comprises a feed receiver module 305 and a page fetching module 310 that obtain product information from the merchant system 120, and a page parser module 315 and a page analysis module 320 used to analyze the obtained product information.

More specifically, the feed receiver 305 receives the feeds provided by the feed provider 122 of the merchant systems 120 of FIG. 1 and makes the feed data available for use by other components of the learning module.

The page fetching module 310 obtains web pages from the web servers 123 of the merchant systems 120 of FIG. 1. When learning the characteristics used to identify information of interest on merchant web pages, the page fetching module 310 obtains the pages directly. For example, the page fetching module 310 can extract the URL of the associated product web page from the feed and then request the page from the web server 123 using the URL. When using the learned characteristics to extract values for the product variables of interest, the page fetching module 310 crawls the various product pages of the web site provided by the web server 123, obtaining a copy of each and optionally storing it within a fetched pages portion of the storage module 325.

The page parser module 315 parses the pages obtained by the page fetching module 310, reducing them to their constituent parts. In one embodiment, the web pages are represented by a document object model (DOM) that stores the page as a tree of interconnected nodes. In this embodiment, the page parser module 315 parses the code of the web pages (e.g., HTML or XML) and produces the page's DOM tree therefrom. Subsequent analysis of a web page is made easier by analyzing this parsed model, rather than the original unparsed code of the web page. DOM tree node types include non-leaf nodes that serve as parents to other nodes, and leaf nodes that lack other nodes as children but include information. For example, product information is typically included within text nodes, which are leaf nodes storing text, e.g., product title, product price, product availability, and the like.

Figure 4:
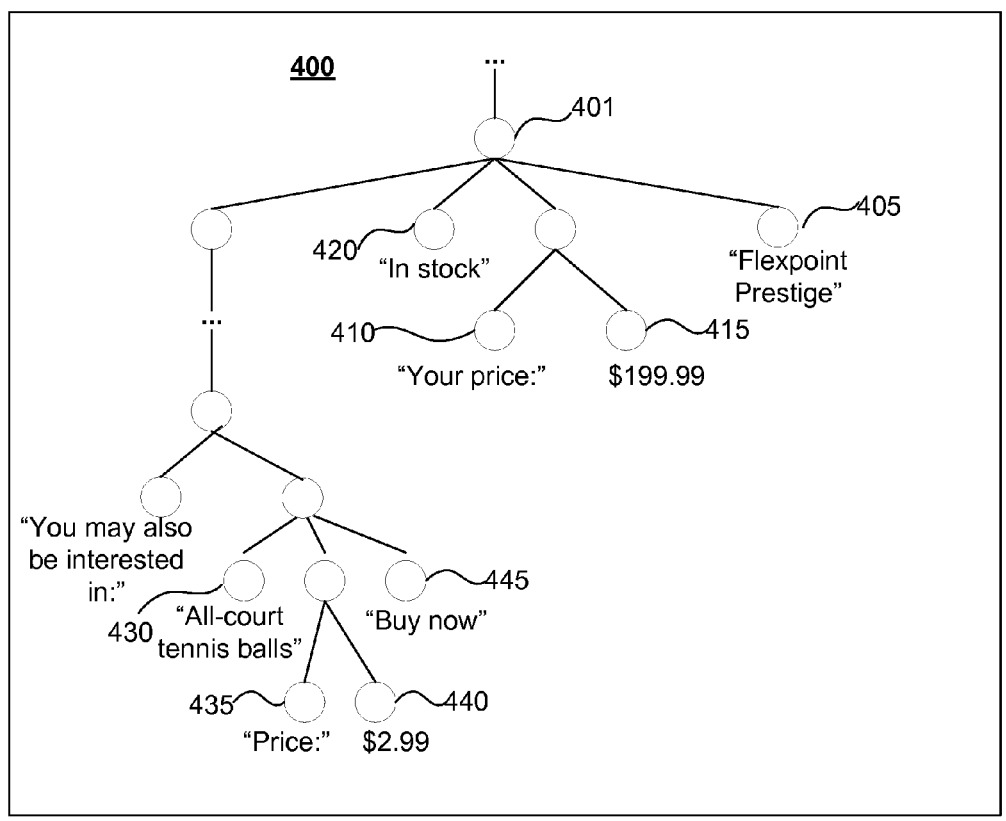
FIG. 4 illustrates a portion of a sample DOM tree for a hypothetical product page.

As one example of a model produced by the page parser module 315, FIG. 4 illustrates a portion of a sample DOM tree for a hypothetical product page for a tennis racquet. Nodes 405-420 occur relatively near the beginning of the document and contain data on variables of interest of the tennis racquet to which the page is devoted. Node 405 is a text node containing text "Flexpoint Prestige" (the name of a racquet model). Nodes 410 and 415 are text nodes containing a label indicating the price ("Your price:") and the price itself ("$199.99"), respectively, and node 420 is a text node containing a string indicating the availability ("In stock"). At some other point in the page, lower in the DOM tree, text nodes 430-445 indicate values of variables of interest of a related product (namely, "All-court tennis balls" with a price indicated by the label "Price", a price of $2.99, and an availability indicated by the phrase "Buy now").

Referring again to FIG. 3, the page analysis module 320 learns characteristics of web pages. In one embodiment, the page analysis module 320 learns the characteristics of portions of product web pages representing the product variables of interest by analyzing portions of the DOM trees or other parsed models produced by the page parser module 315. Various product variables can be analyzed, such as the title of a product, the price of the product, and the availability of the product. The page analysis module 320 identifies candidate portions of the web page (e.g., nodes of a DOM tree) that match values of product variables of interest provided by the corresponding feed, according to some match algorithm. For example, if a feed for a particular product declares the product price to be $39.99, the page analysis module 320 might identify, as candidates, all nodes of the corresponding product page that contain the string "39.99". Based on the identified candidate portions, the page analysis module 320 learns a set of weights for different properties, each weight quantifying the ability of the properties to uniquely identify the product variables of interest. For example, in one embodiment the page analysis module 320 calculates weights for text, tag type, and tag attribute properties associated with the various candidate portions. Further, in one embodiment the page analysis module 320 applies the calculated weights to preliminarily identify the best candidate for each of the product variables of interest. The page analysis module 320 then further learns information on the relationships between the best candidates for the different variables, such as average distances between DOM nodes of identified product titles and identified product prices, for example. This learned information can then later be applied to arbitrary product pages of the associated merchant to identify the product variables of interest. Further details of operations of the page analysis module 320 are described below with respect to the flowcharts of FIGS. 5 and 6.

The storage module 325 stores the various information obtained and/or generated by the components 305-320. For example, the storage module 325 can temporarily store the received feeds, the fetched pages, and the parsed pages until processing of them is complete. Similarly, the storage module 325 stores the learned characteristics, such as the weights and distances between DOM nodes, for future use in identifying the variables of interest. The storage module 325 can be implemented in various ways in different embodiments, as would be known to one of skill in the art. For example, the storage module 325 could be implemented as one or more tables of a relational database management system.

Process of Characteristics Learning and Information Extraction

Figure 5:
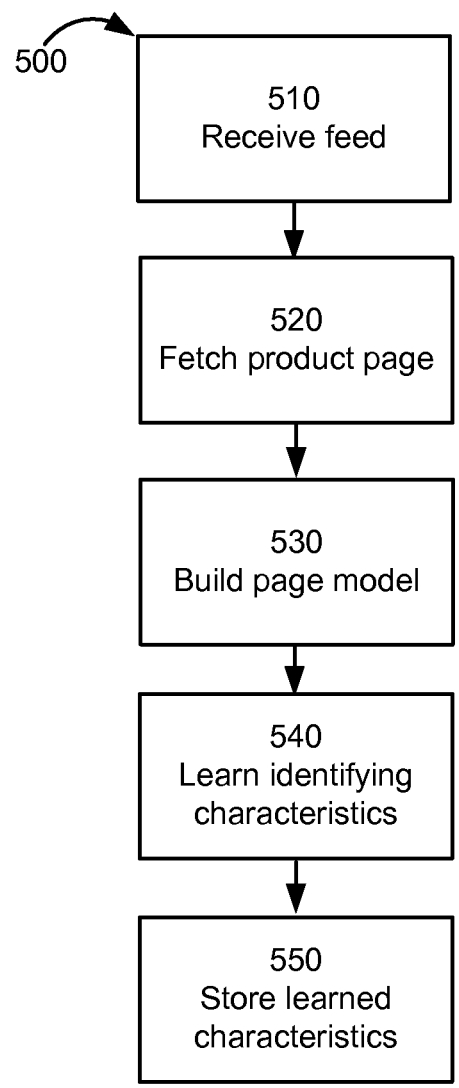
FIG. 5 is a flowchart illustrating a high-level view of steps carried out by the learning module for learning the identifying characteristics of product variables of interest, according to one embodiment.

FIG. 5 is a flowchart illustrating a high-level view of steps carried out by the learning module 102 of FIG. 3 for learning the identifying characteristics of product variables of interest, according to one embodiment. First, the learning module 102 receives 510 a feed for a given product from a merchant system 120, e.g., via the feed receiver module 305. In response, the learning module 102 then fetches 520 a web page corresponding to the product of the feed, such as by requesting a page of a product URL of the feed via the page fetching module 310. The learning module then parses the fetched page and builds 530 a model thereof, such as a DOM tree. The learning module 320 then learns 540, based on the feed and product web page, the characteristics that identify the product variables of interest for the merchant associated with the product. Finally, the learning module 102 stores 550 the learned characteristics—e.g., in the storage module 325—for later use in identifying product variables of interest. For example, the extraction module 104 can use the learned characteristics to identify the product variables of interest on arbitrary product pages of a merchant system 120 and to extract the values associated with the variables. The search module 106 can then include the extracted values as part of query search results.

Figure 6:
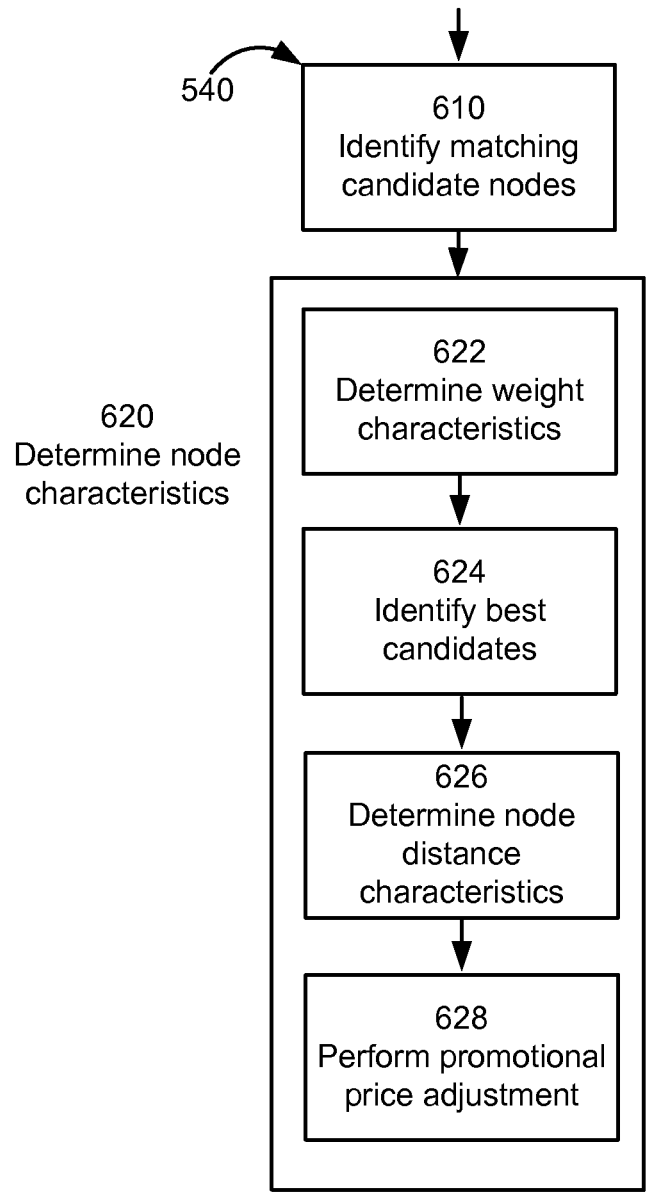
FIG. 6 is a flowchart illustrating in more detail the steps performed when learning the identifying characteristics of product variables of interest, according to one embodiment.

FIG. 6 is a flowchart illustrating in more detail the steps performed when learning the identifying characteristics of product variables of interest, according to one embodiment. The learning module 102 initially identifies 610, for a product page corresponding to a provided product feed, candidate nodes matching values provided in the feed. Candidate nodes can be found for multiple product variables of interest, such as title, price, and availability.

Whether there is a match is determined according to some match algorithm for the data variable of interest, and thus there may be different match algorithms. For example, in one embodiment the match for the title need not be literal, but is based on semantic similarity. Thus, if the feed indicated that the title of the product was "All-court tennis balls," a text node with the value "Durable tennis balls" might be considered a match, given the general semantic similarity. In one embodiment, the match algorithm for price looks for a literal substring of a canonical form of the price indicated by the feed. For example, if a feed for a product indicated that the product price was "$39.00", the learning module 102 might search for text nodes having substrings "$39".

The match for availability tends to be more difficult than that for title or price, given the myriad of possible phrases by which availability can be indicated, such as "In stock," "Available," "Buy now," "Out of stock," "Reserve your copy," and the like. In one embodiment, the match for availability is performed with reference to a pre-existing availability phrase dictionary containing strings relevant to availability and corresponding indicators of whether the string indicates that the product is availability, not available, or neither. For example, in one embodiment the availability dictionary contains 430 distinct phrases, sorted in order from longest to shortest, with phrases indicating availability (e.g., "In stock") marked +1, phrases indicating unavailability (e.g. "Out of stock" marked −1, and inconclusive phrases (e.g., "If the item is in stock,") marked 0. The match algorithm performs a case-insensitive substring match for the strings in the availability phrase dictionary, starting with the longest phrases first. If a text node contains a string in the availability dictionary, the corresponding indicator is read and the search terminates as a match if the indicator is +1 or −1, definitively indicating the availability of the product. If the indicator is 0, the search proceeds to try the next string in the dictionary.

Thus, at the end of the analysis for a given product page there are typically one or more candidate nodes for each of the product variables of interest. As a very simple example, the model of FIG. 4 might lead to identification of two candidates for title (nodes 405 and 430), two candidates for price (415 and 440), and two candidates for availability (420 and 445).

With the candidate nodes identified, the learning module 102 determines 620 identifying characteristics of product variables across a set of product pages of a merchant. Specifically, the characteristics pertain to the particular nodes in which the product variables are represented on the product pages, and are therefore equivalently referred to as "node characteristics." Thus, these characteristics can then later be used to identify the product variables of interest on an arbitrary product page of the merchant by identifying the nodes representing those variables.

In one embodiment, the learning module determines 622—as one type of characteristic of product variables of interest—weights associated with particular distinguishing properties of the various nodes, such as text contents of a nearby label node ("text" property), the type of tag most directly enclosing the candidate ("tag type" property), and attributes of that tag ("tag attributes" property) such as style, color, and the like. Each of the properties is analyzed separately, with lower frequencies of occurrence leading to a higher weight, since greater uniqueness is desirable for purposes of identification. In one embodiment, the weight for a value of a property that occurs N times on the page is $1/N^2$ for N<=2, and 0 for N>2.

For example, referring back to the sample model of FIG. 4, note that the price node 415 of the primary product has an associated text label "Your price:" in the node 410, and assume that it is enclosed within a "<b>" HTML tag with attribute "class=priceRed". Further note that the related product of nodes 430-445 has a price with an associated label of "Price:", and assume that it is enclosed in a "<p>" HTML tag with attribute "class=relatedNormal". Further assume that there are two other such related products with the same associated properties as the first related product, and that the text strings "Your price:" and "Price:" do not occur elsewhere on the page. In such an example, the learning module 102 would determine that the "In stock:" value for the availability property occurred once on the page (thus being assigned a weight of $1/1^2=1$ in the embodiment noted above) and the "Price:" value for the availability property occurred 3 times (thus being assigned a weight of 0 for the same embodiment). The same calculation is performed for each distinct value of each of the properties across the various candidates on the page.

This calculation is performed for the corresponding product pages of some set of feeds (e.g., 40 pages) of a merchant. Then, each distinct value of each property is summed across all the pages, resulting in an aggregate score for each distinct value. As a simple example, the learning module 102 might learn, for a particular merchant, for the price product variable of that merchant, and for the text property of the price product variable, the value-weight pairs <"Your price:", 30>, <"Price:", 5>, and <"List price:", 1.25>, indicating that the label "Your price:" is a stronger indicator of the presence of a price product variable than the label "Price:", which is in turn stronger than the label "List price:". Similarly, for the tag type property of the price product variable of the same merchant, the learning module 102 might learn the value-weight pairs <"<b>", 15>, <"<p>", 6>, and <"<li>", 3>. For the tag attributes property of the price product variable of the same merchant, the learning module 102 might learn the value-weight pairs <"class=priceRed", 25>, <"class=relatedNormal", 10>, <"color=00FFAA", 6>, and <"color=000099", 5>. Each of these weight-value pairs can be considered one characteristic that can be used to identify product variables of interest—the price product variable, in the above example.

Using the learned weights aggregated across the set of feeds, the learning module 102 then once again goes back over the product pages corresponding to the set of feeds, learning additional information in a second round of analysis. As part of the additional learning of the second round, the learning module 102 first identifies 624 the best candidate nodes on the product pages—i.e., those nodes most likely to contain the product variables of interest based on the information learned thus far. In one embodiment, each of the candidates (e.g., the matching candidates determined previously) is assigned a score that is the product of the weights of the candidate node's text, tag type, and tag attribute properties. For each product variable, the candidate node with the highest score is then identified as the best candidate for that variable.

With the best candidates identified, the learning module 102 then determines 626 distances between nodes of the various product variables, the distances serving as another type of characteristic that can be used to identify product variables of interest. Specifically, for each page, the "title level" of the price and availability is calculated. The title level of a variable is defined as the distance from the title node (that is, the node of the identified best candidate for the title) to the nearest common ancestor of the title node and the identified best candidate for the variable. For example, referring to FIG. 4, assume that the nodes 405 and 415 have been identified as the title node and the price node, respectively. Then the "price title level" is 1, since there is only one edge between the title node 405 and the node 401—the closest common ancestor of the nodes 405 and 415. The "availability title level" is calculated in the same way.

Once all the product pages corresponding to the feeds have been analyzed in the second round, the average price title level and average availability title level are computed by summing the price title levels and availability title levels of each product page analyzed in the second round, and dividing each by the number of product pages analyzed. The average title level of a variable indicates the expected size of the subtree, measured from a known title node, in which the variable is expected to be found—that is, how far away from the title the variable might be.

In one embodiment, the learning module also performs 628 a promotional price adjustment to account for promotional prices. For some products, the product page includes both a list price and a special promotional price, the promotional price being the actual price for which the product can be purchased. However, such promotional prices typically have properties that differ from those of a normal list price, such as the text "Special offer price:", and/or tag types and tag attributes that specially emphasize the promotional price. However, due to the infrequency of promotional prices, the weights for their various properties, when aggregated over the entire set of product pages analyzed during training, are comparatively small. This leads scores of promotional prices to typically be smaller than those of normal list prices, with the result that promotional prices are incorrectly not extracted as the price of the product.

To rectify this situation, the promotional price adjustment is performed as follows. After the price node is identified, the learning module 102 determines whether the price is higher than that specified in the associated feed. If so, then the assumption is that the discrepancy is due to a promotional price listed in the feed. Thus, the learning module 102 identifies a highest-scoring price node ("expected price node") that has the price listed in the feed, the assumption being that this node represents a promotional price. The learning module 102 then compares each property value of the identified price node with its corresponding property value in the price node having the expected price. For each property that differs, the weight of the property value of the (presumably promotional) expected price node is set to be larger than the weight of the property value of the price node originally identified. In one embodiment, this is accomplished by the formula $$property_e = property_o * [(score_o + 1)/score_e)]$$

where $property_e$ and $property_o$ are the respective weights of the differing property in the expected price node and the originally identified price node. Similarly, $score_e$ and $score_o$ are the respective scores (i.e., product of the weights of all the node properties) for the expected price node and the originally identified price node.

As an example, assume that the expected price of a product is $39.99, and the and originally identified price is $50.00, and the respective nodes for the prices differed in their text properties (e.g., "Special offer price:" and "List price:") but not in their tag type or tag attribute properties. Further assume that the weights for the text property of the expected and originally identified price nodes are 8 and 25, respectively, and that the weights of the tag type and tag attributes properties are 15 and 30, respectively. Then the weight for the text property value "Special offer price:" is set to 25*[(25*15*30)+1)/(8*15*30)], or approximately 78. Thus, due to the adjustment to the weight of promotional prices, promotional prices will thereafter correctly tend be extracted instead of the higher list prices.

Thus, at the conclusion of the operations of FIG. 6, the learning module 102 has determined a number of characteristics, such as weights and node distances (e.g., title level distances), of the various values for properties that can be used to identify product variables of interest. The characteristics are stored in the storage module 325, in association with the particular merchant system 120 to which they correspond.

Referring again to FIG. 1, the extraction module 104 can then use the learned characteristics to identify the product variables of interest on arbitrary product pages of a merchant system 120 and to extract the values associated with the variables. The product pages on which the extraction module 104 operates may be any product pages of the merchant system, including pages distinct from the pages from which the learning module 102 learned the characteristics.

The extraction module 104 may identify each product variable in a different manner. For example, in one embodiment the extraction module 104 identifies the title product variable as follows. First, all the text nodes in a page are identified, and those that are similar according to some similarity algorithm are retained. Then, the retained nodes are assigned scores as a function of several factors. One factor is the order of the node in the page—e.g., the $N^{th}$ node having its score reduced by the value $1/N^2$. Another factor is the heading level—e.g., whether the closest enclosing header tag is "<h1>", "<h2>", or "<h3>", with tags indicating lesser importance leading to a lesser score. A third factor is the product of the node's weights for its tag type and tag attributes, with greater products leading to a higher score. The retained node with the highest score is then extracted as the title for the product.

In one embodiment, the extraction module 104 identifies the price product variable as follows. First, all the text nodes in a page having a currency-like value (e.g., a string of the form $D+.DD or $D+, where 'D+' represents one or more digits and 'DD' exactly 2 digits) are retained. Then, for each retained node a score is assigned, the score being the product of the node's weights for the text and tag attribute properties. If the candidate price with the highest score has a title level not greater than the previously-calculated average title level, then it is extracted as the price for the product. Otherwise, the candidate price with the minimum title level and a weight greater than a quarter of the minimum price weight is extracted.

In one embodiment, the extraction module 104 identifies the availability product variable as follows. First, all the text nodes in a page are selected. For each, a score is assigned, the score being the product of the weights of the node's text, tag type, and tag attribute properties. Then, nodes are retained that satisfy the following properties: (1) The node text contains one of the strings in the availability phrase dictionary, and (2) the title level of the node is at most the average availability title level. The highest-scoring retained node is then extracted as the availability phrase for the product, with the availability being the indicator associated with the extracted availability phrase in the availability phrase dictionary. For example, if the extracted phrase is "In stock", the availability is the associated +1 from the dictionary, indicating that the product is available.

In one embodiment, the learning module 102 and the extraction module 104 perform the above-described actions on a frequent basis in order to ensure that the extracted information is up-to-date. For example, in one embodiment the learning module 102 runs the learning algorithms every four hours with respect to some merchants, such that each merchant has its characteristics relearned every day. Thus, in this embodiment the learning schedule is independent of the frequency of feeds from the feed providers 122 of the merchant systems 120.

In short, the learning module 102 of the information retrieval system learns characteristics—e.g., node property value weights and node distances—identifying variables of interest within web pages of an organization, such as the web pages of a particular merchant. The extraction module 104 can then use the learned characteristics to extract values of the variables of interest from web pages provided by the organization. The web pages from which the values are extracted by the extraction module 104 need not be limited to the web pages from which the characteristics were learned. The variable values that were extracted can then be used in various ways, such as being included within search results by the search module 106.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for the purpose of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a computer processor of learning characteristics of product variables within web pages of a merchant, the method comprising:
    receiving a product feed identifying a product offered by the merchant and having a value for a product variable associated with the product, wherein at least one of the product variables is a price product variable stating a price of the product;
    obtaining a web page of the merchant, the web page being associated with the product;
    producing, by the computer processor, a model representing the web page, the model having a set of nodes representing portions of data of the web page, wherein at least one of the nodes is a price node;
    identifying candidate nodes of the model that match the product feed value for the product variable;
    learning, based at least in part on the candidate nodes, product variable characteristics expected of a node representing the product variable; and
    storing the learned product variable characteristics.

2. The computer-implemented method of claim 1, further comprising extracting a value for the product variable from a new web page of the merchant at least in part using the learned product variable characteristics.

3. The computer-implemented method of claim 2, further comprising:
    receiving a search query; and
    providing a set of search results corresponding to the search query, the search results including at least a portion of the extracted values for the product variables.

4. The computer-implemented method of claim 2, wherein the value for the product variable from the new web page corresponds to a second product different from the product identified by the product feed.

5. The computer-implemented method of claim 1, wherein each candidate node has a plurality of distinct node properties, and wherein learning the product variable characteristics comprises:
    identifying property values for each of the node properties of the candidate nodes; and
    computing weights for the identified property values based on frequencies of occurrence of the identified property values in the model of the web page, the weight for a particular property value indicating a likelihood that a node having that property value represents the product variable.

6. The computer-implemented method of claim 5, wherein the node properties include, for a given node, at least one of:
    a text property indicating a label of an associated node, a tag type property indicating a type of a tag associated with the node, and a tag attributes property indicating attributes of the tag associated with the node.

7. The computer-implemented method of claim 5, the method further comprising:
    identifying one of the candidate nodes as a best candidate node for the price product variable based at least in part on the computed weights;
    responsive to determining that a value for the price product variable in the feed is less than a price value of the identified best candidate node for the price product variable:
    identifying a second candidate node that has a price value matching the value for a product price variable in the feed;
    identifying a property such that a value of the property for the best candidate node differs from a value of the property for the second candidate node; and
    setting a weight of the value of the property for the second candidate node to be greater than the weight of the value of the property for the best candidate node.

8. The computer-implemented method of claim 1, wherein learning the product variable characteristics comprises:
    identifying, from the identified candidate nodes, a best candidate node for the product variable;
    identifying, from the nodes of the model, a best candidate node for a second product variable;
    identifying a node of the model that is a common ancestor of the best candidate node for the first product variable and the best candidate node for the second product variable;
    computing a node distance between the best candidate node for the product variable and the common ancestor node; and computing an expected node distance between a node representing the product variable and a node representing the second product variable based at least in part on the computed node distance.

9. The computer-implemented method of claim 1, wherein the product variable is an availability of the product, and wherein identifying candidate nodes of the model that match the product feed value for the availability comprises determining whether values of the candidate nodes include one of a number of entries in an availability phrase dictionary.

10. The computer-implemented method of claim 1, further comprising performing at least the obtaining, producing, identifying, and learning for the merchant according to a predetermined schedule, independent of frequency of receipt of the product feed.

11. A computer system for learning characteristics of product variables within web pages of a merchant, the system comprising: a computer processor; and a computer program executable by the computer processor and performing actions comprising:
   receiving a product feed identifying a product offered by the merchant and having a value for a product variable associated with the product, wherein at least one of the product variables is a price product variable stating a price of the product;
   obtaining a web page of the merchant, the web page being associated with the product;
   producing a model representing the web page, the model having a set of nodes representing portions of data of the web page;
   identifying candidate nodes of the model that match the product feed value for the product variable, wherein at least one of the nodes is a price node;
   learning, based at least in part on the candidate nodes, product variable characteristics expected of a node representing the product variable; and
   storing the learned product variable characteristics.

12. The system of claim 11, the performed actions further comprising extracting a value for the product variable from a new web page of the merchant at least in part using the stored product variable characteristics.

13. The system of claim 12, the performed actions further comprising:
   receiving a search query; and
   providing a set of search results corresponding to the search query, the search results including at least a portion of the extracted values for the product variables.

14. The system of claim 11, wherein each candidate node has a plurality of distinct node properties, and wherein learning the product variable characteristics comprises:
   identifying property values for each of the node properties of the candidate nodes; and
   computing weights for the identified property values based on frequencies of occurrence of the identified property values in the model of the web page, the weight for a particular property value indicating a likelihood that a node having that property value represents the product variable.

15. The system of claim 14, wherein the node properties include, for a given node, at least one of:
   a text property indicating a label of an associated node, a tag type property indicating a type of a tag associated with the node, and a tag attributes property indicating attributes of the tag associated with the node.

16. The system of claim 14, the performed actions further comprising:

identifying one of the candidate nodes as a best candidate node for the price product variable based at least in part on the computed weights;
responsive to determining that a value for the price product variable in the feed is less than a price value of the identified best candidate node for the price product variable:
   identifying a second candidate node that has a price value matching the value for a product price variable in the feed;
   identifying a property such that a value of the property for the best candidate node differs from a value of the property for the second candidate node; and
   setting a weight of the value of the property for the second candidate node to be greater than the weight of the value of the property for the best candidate node.

17. The system of claim 11, wherein learning the product variable characteristics comprises:
   identifying, from the identified candidate nodes, a best candidate node for the product variable;
   identifying, from the nodes of the model, a best candidate node for a second product variable;
   identifying a node of the model that is a common ancestor of the best candidate node for the first product variable and the best candidate node for the second product variable;
   computing a node distance between the best candidate node for the product variable and the common ancestor node; and
   computing an expected node distance between a node representing the product variable and a node representing the second product variable based at least in part on the computed node distance.

18. The system of claim 11, wherein the product variable is an availability of the product, and wherein identifying candidate nodes of the model that match the product feed value for the availability comprises determining whether values of the candidate nodes include one of a number of entries in an availability phrase dictionary.

19. A non-transitory computer-readable storage medium having executable computer program instructions embodied therein for learning characteristics of product variables within web pages of a merchant, actions of the computer program instructions comprising:
   receiving a product feed identifying a product offered by the merchant and having a value for a product variable associated with the product, wherein at least one of the product variables is a price product variable stating a price of the product;
   obtaining a web page of the merchant, the web page being associated with the product;
   producing a model representing the web page, the model having a set of nodes representing portions of data of the web page;
   identifying candidate nodes of the model that match the product feed value for the product variable, wherein at least one of the nodes is a price node;
   learning, based at least in part on the candidate nodes, product variable characteristics expected of a node representing the product variable; and
   storing the learned product variable characteristics.

20. The non-transitory computer-readable storage medium of claim 19, wherein each candidate node has a plurality of distinct node properties, and wherein learning the product variable characteristics comprises:
   identifying property values for each of the node properties of the candidate nodes; and computing weights for the identified property values based on frequencies of occurrence of the identified property values in the model of the web page, the weight for a particular property value indicating a likelihood that a node having that property value represents the product variable.

21. The non-transitory computer-readable storage medium of claim 20, wherein the node properties include, for a given node, at least one of:

a text property indicating a label of an associated node, a tag type property indicating a type of a tag associated with the node, and a tag attributes property indicating attributes of the tag associated with the node.

22. The non-transitory computer-readable storage medium of claim 19, wherein learning the product variable characteristics comprises:

identifying, from the identified candidate nodes, a best candidate node for the product variable;

identifying, from the nodes of the model, a best candidate node for a second product variable;

identifying a node of the model that is a common ancestor of the best candidate node for the first product variable and the best candidate node for the second product variable;

computing a node distance between the best candidate node for the product variable and the common ancestor node; and computing an expected node distance between a node representing the product variable and a node representing the second product variable based at least in part on the computed node distance.

* * * * *